US009180763B2

(12) United States Patent
Fournier et al.

(10) Patent No.: US 9,180,763 B2
(45) Date of Patent: Nov. 10, 2015

(54) COVER FOR A VEHICLE

(71) Applicant: BOMBARDIER RECREATIONAL PRODUCTS INC., Valcourt (CA)

(72) Inventors: Eric Fournier, Orford (CA); Jean-Simon Lavallee, Sherbrooke (CA); Daniel Girard, Sherbrooke (CA); Annie Leclerc, Magog (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/319,270

(22) Filed: Jun. 30, 2014

(65) Prior Publication Data

US 2014/0311637 A1 Oct. 23, 2014

Related U.S. Application Data

(63) Continuation of application No. 13/185,101, filed on Jul. 18, 2011, now Pat. No. 8,764,097.

(60) Provisional application No. 61/365,078, filed on Jul. 16, 2010.

(51) Int. Cl.
*B60J 11/06* (2006.01)
*B60J 11/04* (2006.01)
*F16B 2/24* (2006.01)

(52) U.S. Cl.
CPC ........ *B60J 11/06* (2013.01); *B60J 11/04* (2013.01); *F16B 2/245* (2013.01)

(58) Field of Classification Search
CPC ............ B60J 11/06; B60J 11/04; F16B 2/245
USPC ............. 296/136.01, 136.07, 136.03, 136.08, 296/136.1, 136.15, 136.16; 150/166
See application file for complete search history.

(56) References Cited

U.S. PATENT DOCUMENTS

| 642,236 A | 1/1900 | Larimer |
| 3,141,221 A | 7/1964 | Faulls |
| 4,566,236 A | 1/1986 | Pound |
| 4,694,543 A | 9/1987 | Conley |
| 4,887,626 A | 12/1989 | Dalo et al. |

(Continued)

FOREIGN PATENT DOCUMENTS

| EP | 0330086 A1 | 8/1989 |
| WO | 2008043126 A1 | 4/2008 |

OTHER PUBLICATIONS

English abstract of EP 0330086, Published on Aug. 30, 1989. Retrieved from Internet: URL:http://worldwide.espacenet.com on Jul. 23, 2014.

*Primary Examiner* — Joseph D Pape
(74) *Attorney, Agent, or Firm* — BCF LLP

(57) ABSTRACT

A cover for covering at least partially a vehicle comprises a cover body and at least two clips connected the cover body. Each of the at least two clips includes a first portion connected at least partially to the cover body. The first portion is adapted to bias the cover body toward the vehicle when the cover covers the vehicle. A second portion has a first end and a second end. The first end is connected to the first portion. The second portion is adapted to selectively connect to a first vehicle portion. A third portion has a first end and a second end. The third portion is adapted to selectively abut against a second vehicle portion. The first end of the third portion is connected to the second end of the second portion. The third portion is at an angle with respect to the first portion.

20 Claims, 13 Drawing Sheets

(56) References Cited

U.S. PATENT DOCUMENTS

| | | |
|---|---|---|
| 5,182,827 A | 2/1993 | Carrier et al. |
| 5,239,709 A | 8/1993 | Masotti |
| 5,380,120 A | 1/1995 | Vermeulen |
| 5,752,297 A | 5/1998 | Ramey |
| 6,129,408 A | 10/2000 | Schultz et al. |
| 6,148,488 A | 11/2000 | Gristock |
| 6,496,990 B2 | 12/2002 | Last |
| 6,530,190 B2 | 3/2003 | Conachen |
| 6,964,448 B2 | 11/2005 | Morin |
| 7,162,836 B2 | 1/2007 | Van Straaten |
| 7,963,585 B2 | 6/2011 | Jones et al. |
| 8,075,045 B2 | 12/2011 | Auger |

COVER FOR A VEHICLE

CROSS-REFERENCE

The present application is a continuation of U.S. patent application Ser. No. 13/185,101, filed Jul. 18, 2011, which claims priority to U.S. Provisional Application No. 61/365,078, filed Jul. 16, 2010, the entirety of both of which is incorporated herein by reference.

TECHNICAL FIELD

The present relates to protective covers for vehicles.

BACKGROUND

Certain vehicles, for example recreational vehicles, are normally covered with protective covers during storage or when they are being towed by another vehicle. The covers provide protection against the elements of nature, such as the sun, snow and dirt.

Conventionally, covers are designed to snugly fit over the particular vehicle to be covered. Soft, lightweight covers are often used as they can easily be folded up and stored away when not in use. Such conventional covers generally comprise a large upper portion made of nylon or similarly weatherproof material which is sized and fitted to slide over the top of the entire upper body portion of the vehicle. In the example of a snowmobile, the cover generally covers the forward fairings of the external shell and the seat portion. Typically, the wheels or skis and track of the vehicle are left uncovered by this type of cover, however the cover may alternatively cover one or more of these.

A system of straps or attachments is conventionally used to secure the cover to the vehicle. An example of such attachment is described in U.S. Pat. No. 6,964,448. Typically, when the user wants to cover the vehicle, he disposes the cover over the vehicle and reaches under the vehicle for securing the attachment straps thereunder. In some cases, the straps are also to be secured around the suspension elements. When doing so, the user may get dirty due to the snow and/or dirt accumulated under and over the vehicle. Furthermore, to perform the operation, the user usually lowers at least one knee on the ground, which can cause discomfort. When the user wants to remove the cover, he has to undo all the straps in a similar way and therefore with the same inconveniences.

Therefore, there is a need for a vehicle cover that would be easy to install and remove.

SUMMARY

In one aspect, a cover for a vehicle that has clips for securing at least sides of the cover to parts of the vehicle is provided.

In one aspect, the present provides a cover for covering at least partially a vehicle. The cover comprises a cover body, and at least two clips connected to opposite sides of the cover body. Each of the at least two clips includes a first portion connected at least partially to the cover body. The first portion is adapted to bias the cover body toward the vehicle when the cover covers the vehicle. A second portion has a first end and a second end. The first end is connected to the first portion. The second portion is adapted to selectively connect to a first vehicle portion of the vehicle. A third portion has a first end and a second end. The third portion is adapted to selectively abut against a second vehicle portion of the vehicle. The first end of the third portion is connected to the second end of the second portion. The third portion is at an angle with respect to the first portion.

In an additional aspect, the at least two clips further includes a handle portion operatively connected to the second end of the third portion.

In a further aspect, each of the at least two clips are at least partially resilient.

In an additional aspect, at least one of the first portion and the third portion of each of the at least two clips is substantially flat.

In a further aspect, each of the at least two clips is integrally formed.

In an additional aspect, each the at least two clips is removably connected to the cover body.

In a further aspect, the first portion of each of the at least two clips has a bend.

In an additional aspect, the second portion of each of the at least two clips is adapted to be congruent at least in part with the first vehicle portion.

In a further aspect, at least a portion of the second portion of each of the at least two clips is connected to the cover body.

In an additional aspect, the second portion of each of the at least two clips includes a protrusion. The protrusion is adapted to selectively abut a third vehicle portion of the vehicle.

In a further aspect, the third portion of each of the at least two clips is disposed at least partially vertically below the protrusion when the cover covers the vehicle. The third portion of each of the at least two clips is operable by a user to cause the protrusion to be spaced from the third vehicle portion for removing the cover from the vehicle.

In a further aspect, the second portion of each of the at least two clips includes a protrusion and the clip further comprises an insert. The insert is connected to the protrusion. The insert is adapted to selectively abut a third portion of the vehicle.

In an additional aspect, the insert of each of the at least two clips is removably connected to the protrusion.

In a further aspect, the insert of each of the at least two clips is connected to the protrusion by friction fit.

In another aspect, the present provides a cover for covering at least partially a snowmobile. The snowmobile has left and right footrests. The cover comprises a cover body, and at least left and right first clips connected to opposite sides of the cover body. The at least left and right first clips are located on the cover body so as to connect to the left and right footrests respectively when the cover covers the snowmobile. Each of the at least left and right first clips includes a first portion connected at least partially to the cover body. The first portion is adapted to bias the cover body toward the snowmobile when the cover covers the snowmobile. A second portion has a first end and a second end. The first end is connected to the first portion. The second portion is adapted to selectively connect to one of the left and right foot rests. A third portion has a first end and a second end. The third portion is adapted to selectively abut against the one of the left and right foot rests. The first end of the third portion is connected to the second end of the second portion. The third portion is at an angle with respect to the first portion.

In a further aspect, at least left and right second clips are connected to the cover body. The at least left and right second clips are located on the cover body so as to connect to the left and right front suspension arms of the snowmobile respectively when the cover covers the snowmobile.

In an additional aspect, each of the at least left and right first clips further includes a handle portion connected to the second end of the third portion.

In a further aspect, at least one of the first portion and the third portion of each of the at least left and right first clips is substantially flat.

In an additional aspect, the third portion of the at least left and right first clips is adapted to abut against an underside of the left and right foot rests.

In a further aspect, the at least left and right first clips are removably connected to the cover body.

In an additional aspect, the first portion of the at least left and right first clips has a bend.

In a further aspect, the second portion of the at least left and right first clips is adapted to be congruent at least in part with an external edge of the left and right foot rests.

In an additional aspect, the at least left and right first clips are at least partially resilient.

In a further aspect, the at least left and right first clips are integrally formed.

In an additional aspect, the cover is adapted to cover at least partially a snowmobile.

In yet another aspect, the present provides a cover for covering at least partially a vehicle. The cover comprises a cover body. At least two clips are connected to opposite sides of the cover body. Each of the at least two clips includes a first portion connected at least partially to the cover body. The first portion is adapted to bias the cover body toward the vehicle when the cover covers the vehicle. A second portion has a first end and a second end. The first end is connected to the first portion. The second portion is adapted to surround at least partially a first vehicle portion of the vehicle. A protrusion is connected to the second portion. The protrusion is adapted to selectively abut to a second vehicle portion of the vehicle.

In an additional aspect, each of the at least two clips further includes a third portion. The third portion has a first end and a second end. The first end of the third portion is connected to the second end of the second portion. The third portion is disposed at least partially vertically below the protrusion when the cover covers the vehicle. The third portion is operable by a user to cause the protrusion to be spaced from the second vehicle portion for removing the cover from the vehicle.

In an additional aspect, of each of the at least two clips further comprises an insert. The insert is connected to the protrusion. The insert is adapted to selectively abut against the second vehicle portion.

In a further aspect, the insert of each of the at least two clips is removably connected to the protrusion.

In an additional aspect, the insert of each of the at least two clips is connected to the protrusion by friction fit.

In a further aspect, the second portion of each of the at least two clips is adapted to selectively abut at least a portion of the first vehicle portion.

In an additional aspect, the cover is adapted to cover at least partially a snowmobile.

For purposes of this application, terms related to spatial orientation when referring to the vehicle orientation such as forwardly, rearwardly, left, and right are as they would normally be understood by a driver of the vehicle sitting thereon in a normal riding position.

Embodiments of the present each have at least one of the above-mentioned aspects, but do not necessarily have all of them.

Additional and/or alternative features, aspects, and advantages of embodiments of the present will become apparent from the following description, the accompanying drawings, and the appended claims.

BRIEF DESCRIPTION OF THE DRAWINGS

For a better understanding of the present, as well as other aspects and further features thereof, reference is made to the following description which is to be used in conjunction with the accompanying drawings, where.

DETAILED DESCRIPTION

Embodiments of vehicle covers will be described with respect to their use with snowmobiles. It is contemplated that the covers could be adapted to other types of vehicles. For example, the covers could be used in ATVs, three-wheeled motorized vehicles or motorcycles.

There will now be described a snowmobile 100 on which a cover 200 can be used. It should be understood that the snowmobile 100 is only one possible example of a snowmobile that can be covered with the cover 200.

Figure 1:
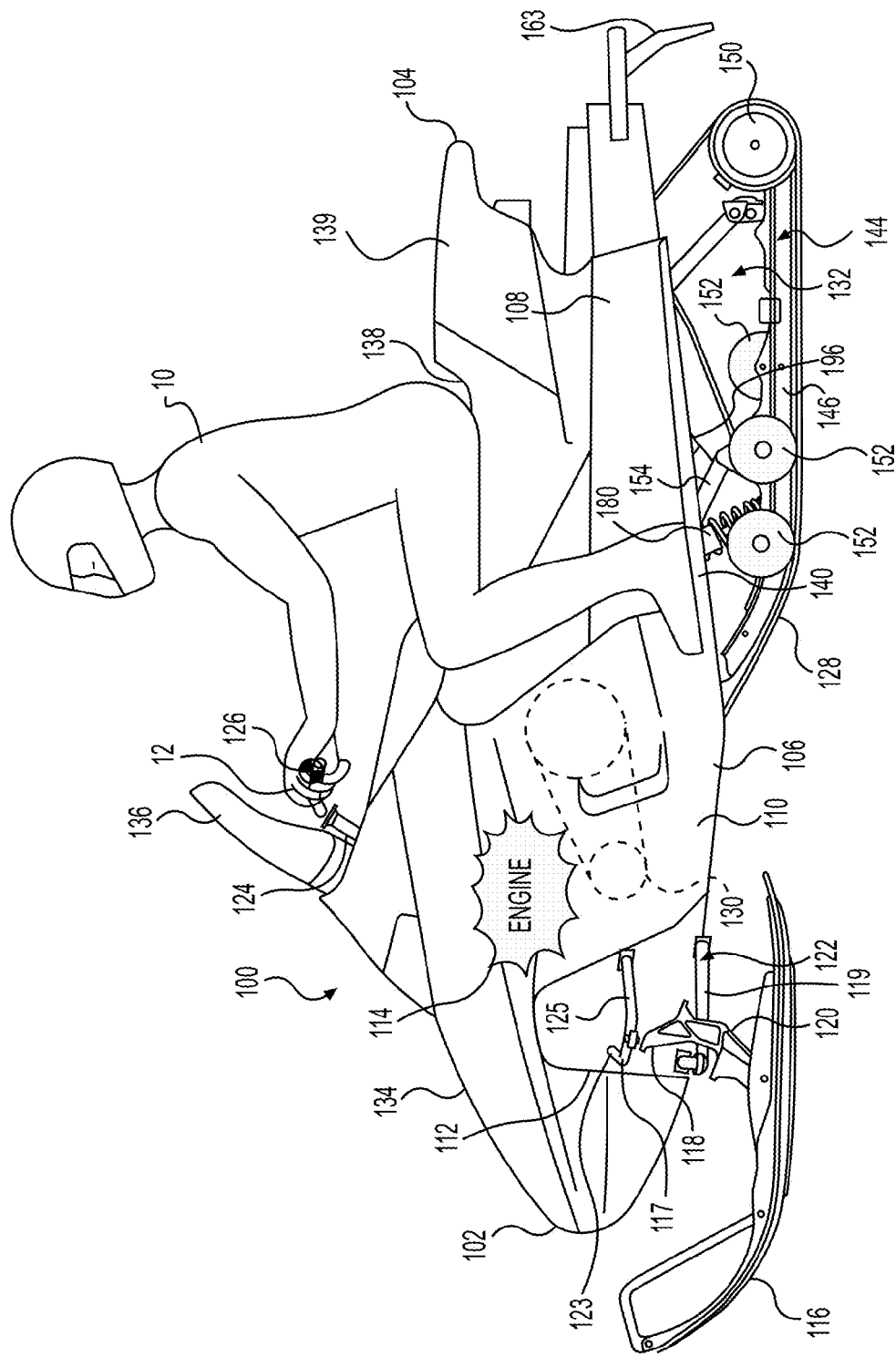
FIG. 1 is a left side elevation view of a snowmobile with a user thereon.

Referring now to FIG. 1, the snowmobile 100 has a front end 102 and a rear end 104, which are defined consistently with the forward travel direction of the vehicle. The snowmobile 100 includes a chassis 106 which includes a tunnel 108, an engine cradle portion 110 and a front suspension assembly portion 112.

An engine 114, which is schematically illustrated, is carried by the engine cradle portion 110 of the chassis 106. A ski and steering assembly is provided, in which two skis 116 (only one of which is shown in FIG. 1) are positioned at the front end 102 of the snowmobile 100, and are attached to the front suspension assembly portion 112 of the chassis 106 through a front suspension assembly 118.

The front suspension assembly 118 includes ski legs 120, supporting arms 122, spindles and ball joints for operatively joining the respective ski legs 120, supporting arms 122 and a steering column 124. The arms 122 includes left and right upper A-arms 117 and left and right lower A-arms 119 (only left upper and lower A-arms 117, 119 being shown in FIG. 1). The upper A-arms 117 and lower A-arms 119 have each a front portion 123 and a rear portion 125. It is contemplated that the front suspension assembly 118 could be different from a double A-arm suspension described above.

The steering column 124 at its upper end is attached to a handlebar 126 which is positioned forward of a user 10 and behind the engine 114 to rotate the ski legs 120 and thus the skis 116, in order to steer the vehicle.

An endless drive track 128 is positioned at the rear end 104 of the snowmobile 100 and is disposed under the tunnel 108. The endless drive track 128 is operatively connected to the engine 114 through a belt transmission system 130 which is schematically illustrated in broken lines. Thus, the endless drive track 128 is driven to run about a rear suspension assembly 132 for propulsion of the snowmobile 100.

The rear suspension assembly 132 comprises a front shock absorber 180 and a rear shock absorber 196. The front shock absorber 180 extends rearwardly and downwardly from a front portion of the tunnel 108, and is disposed between the tunnel 108 and a slide frame assembly 144, partially forward of front suspension arms 154 of the rear suspension assembly 132. The rear shock absorber 196 extends forwardly and downwardly from a rear portion of the tunnel 108, and is disposed at least in part rearwardly of the front suspension arms 154. The suspension assembly 132 comprises other elements well known in the art, and as such they will not be described herein.

The endless drive track 128 is engaged with and driven by a drive sprocket (not shown) which is journaled by the tunnel 108 and is driven by the engine 114 through the belt transmission system 130. The slide frame assembly 144 primarily includes a pair of spaced apart slide rails 146 that engage the inner side of the ground-engaging portion of the endless drive track 128. The slide frame assembly 144 journals a plurality of backup rollers (not shown) and four idler rollers 150. In addition, further rollers 152 are carried by the tunnel 108, in order to define the path over which the endless drive track 128 travels.

At the front end 102 of the snowmobile 100, fairings 134 are provided that enclose the engine 114 and the belt transmission system 130, thereby providing an external shell that not only protects the engine 114 and the belt transmission system 130, but also make the snowmobile 100 more aesthetically pleasing. The fairings 134 include a hood and one or more side panels which can be opened to allow access to the engine 114 and the belt transmission system 130 when this is required, for example for inspection or maintenance of the engine 114 and/or the belt transmission system 130. A windshield 136 is connected to the fairings 134 near the front end 102 of the snowmobile 100. Alternatively, the windshield 136 can be attached directly to the handlebar 126. The windshield 136 acts as a windscreen to lessen the force of the air on the user 10 while the snowmobile 100 is moving.

At the rear end 104 of the snowmobile 100, a snow flap 163 is connected to a rear end of the tunnel 108. The snow flap 163 protects against dirt that could be projected from the drive track 128 when driving. It is contemplated that the snow flap 163 could be omitted.

A seat 138 is disposed rearward of the handlebar 126. A rear portion 139 of the seat 138 may include a storage compartment, or may be used to accept a passenger seat. Two foot rests 140 (only one of which is shown in FIG. 1) are positioned on opposed sides of the snowmobile 100 below the seat 138 to accommodate the rider's feet. The foot rests 140 have an external edge 142 (shown in FIG. 7) extending therefrom, that is generally rounded. The foot rests 140 include a plurality of apertures (not shown) and gripping elements (not shown). It is contemplated that the foot rests 140 could be different from the ones described above. It is contemplated that the external edges 142 could be removable from the foot rests 140.

The snowmobile 100 includes other elements well known in the art, and as such they will not be described in detail herein.

Figure 2:
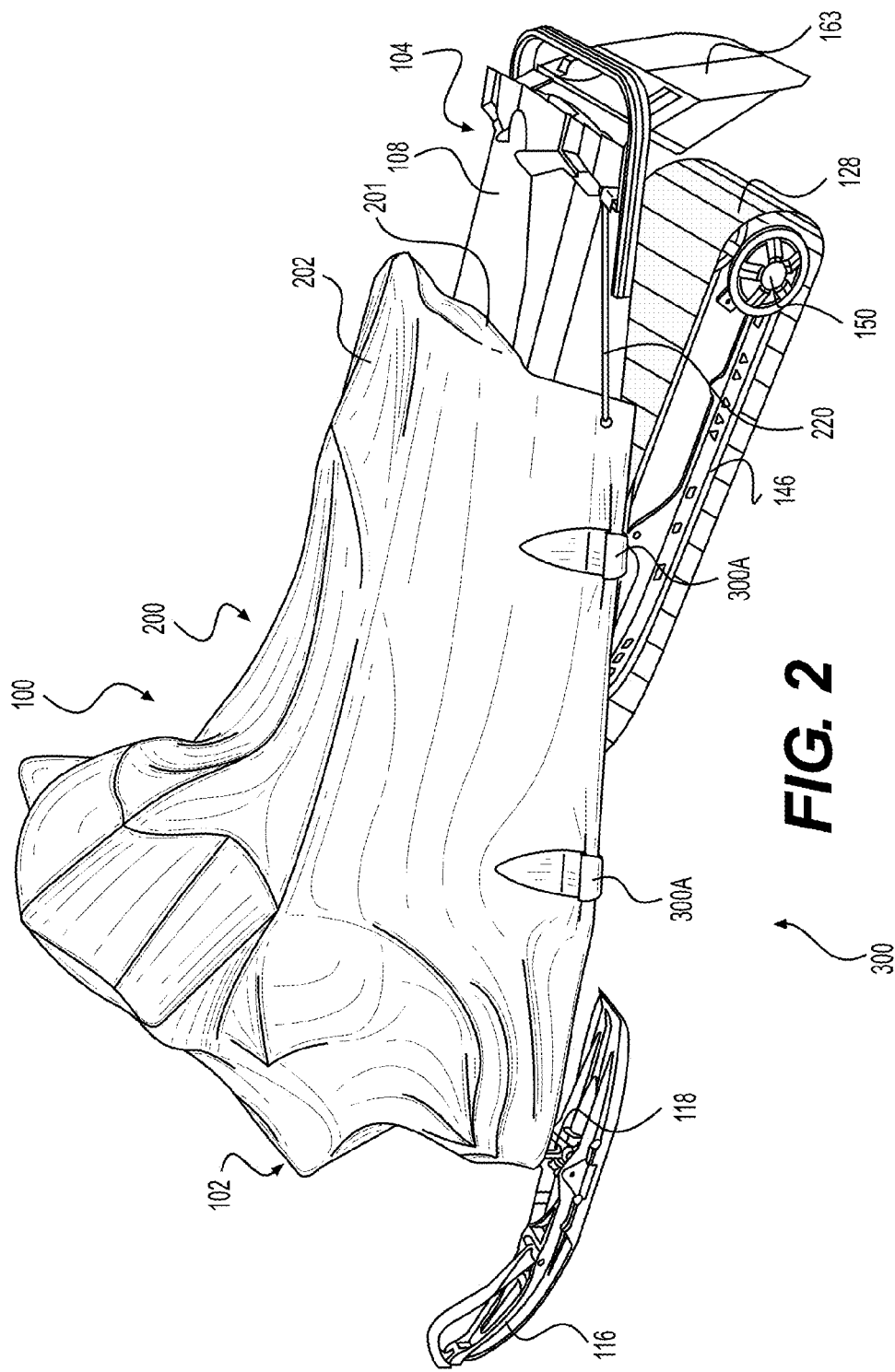
FIG. 2 is a perspective view taken from, a rear, left side of an embodiment of a cover covering the snowmobile of FIG. 1.
Figure 3:
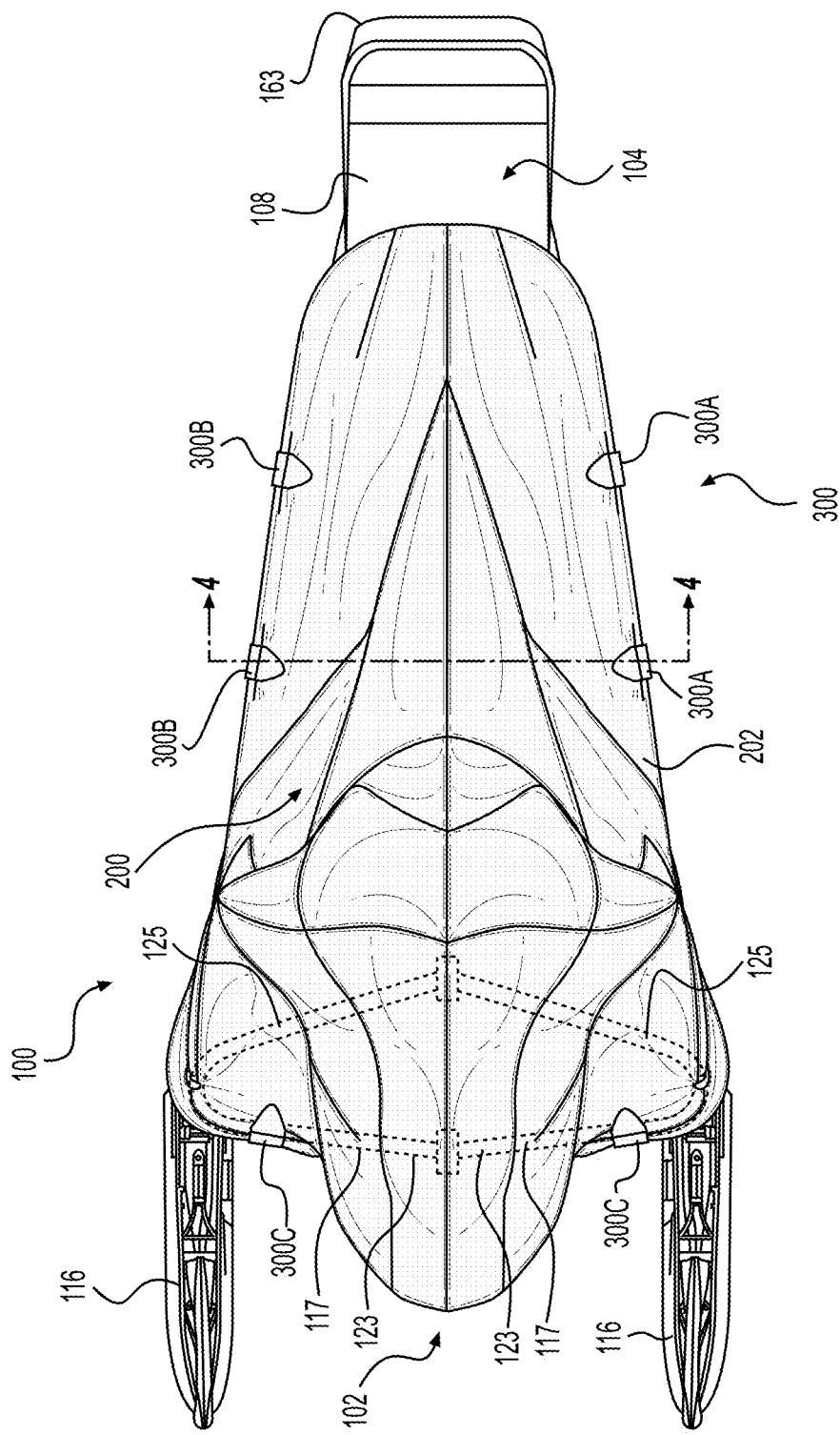
FIG. 3 is a top plan view of the cover and snowmobile of FIG. 2.
Figure 4:
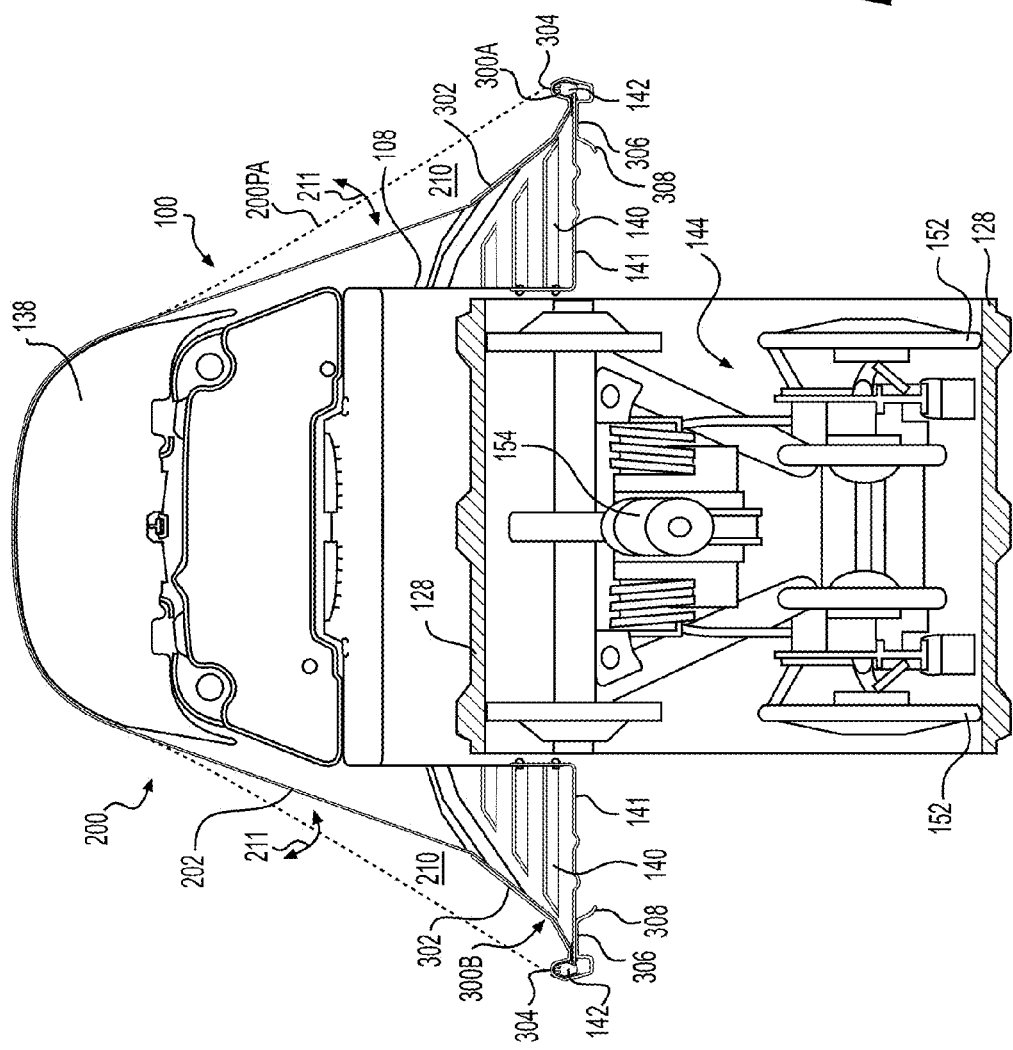
FIG. 4 is a cross-sectional view of the cover and snowmobile taken along line 4-4 of FIG. 3.

Referring now to FIGS. 2 to 4, the cover 200 for the snowmobile 100 will be described.

The cover 200 is a removable protective cover that is disposed over the snowmobile 100 when the snowmobile is not in use. The cover 200 is intended to protect the snowmobile 100 from elements of nature (snow, dirt, sun, etc.). The cover 200, when covering the snowmobile as shown in FIG. 2, covers the snowmobile 100 longitudinally from the front 102 up to the rear portion 139 of the seat 138, and laterally from the edge 142 of the left to the edge 142 of the right foot rests 140. It is contemplated that the cover 200 could cover more or less of the snowmobile 100. It is also contemplated that more than one cover could be used or that the cover 200 could be made of multiple sections selectively connected to each other.

The cover 200 includes a cover body 202 and a plurality of clips 300 disposed along sides of the cover body 202. The cover body 202 is made of polyester which is a waterproof material, resistant to wind and to freezing temperatures. It is contemplated that the cover body 202 could be made of other materials such as cotton or nylon or other similar materials. The cover body 202 is flexible and can be folded for storage of the protective cover 200 when the snowmobile 100 is in use.

The plurality of clips 300 is fixedly connected to the cover body 202. It is contemplated that the clips 300 could be sewn, glued or fixedly connected to the cover body 202 by other means. It is also contemplated that the clips 300 could be removably connected to the cover body 202. For example, the clips 300 could be removably connected to the cover body 202 by a zipper, snaps, hook and loop fasteners or buttons. The plurality of clips 300 are positioned so as to be at about regular intervals from each other. It is contemplated that the clips 300 could be positioned on the cover body 202 at positions other than those shown in the Figures.

The plurality of clips 300 includes two left side clips 300A, two right side clips 300B, and two front clips (left and right) 300C. When the protective cover 200 covers the snowmobile 100, the two left side clips 300 connect the cover 200 to the left foot rest 140, the two right side clips 300 connect the cover 200 to the right foot rest 140, the left front clip 300C connects the cover 200 to the left front suspension assembly 118, and the right front clip 300C connects the cover 200 to the right front suspension assembly 118. It is contemplated that more or less than two front clips 300C, two left side clips 300A and two right side clips 300B could be used.

Each clip 300 is integrally formed and is made of nylon which is a resilient plastic. The clips 300 can be flexed and recover their original shape once the force to flex them is removed. It is contemplated that the clips 300 could be made of a resilient material other than nylon and other than a plastic, which would remain flexible in temperatures ranging from +40 to −40 degrees C. For example, the clips 300 could be made of a resilient metal. It is also contemplated that only a portion of the clips 300 could be resilient. It is also contemplated that the clips 300 could not be resilient. For example, the clips 300 could have a single loaded hinge. It is also contemplated that the clips 300 could not be integrally formed. The clips 300 will be described in greater detail below.

The cover 200 also includes a pair of bungee cords 220 (only one being shown in FIG. 2) connected to opposite sides of the cover 200 at a rear 201 of the cover 200. When the cover 200 covers the snowmobile 100, the bungee cords 220 are hooked to a rear of the tunnel 108, and they exert a longitudinal tension on the cover 200 to tighten the cover 200 around the snowmobile 100. It is contemplated that the bungee cords 220 could be hooked to a different portion of the tunnel 108. It is also contemplated that the bungee cords 220 could be hooked to another portion of the snowmobile 100. For example, the bungee cords 220 could be hooked to a portion of the foot rests 140 extending rearwardly from the point where the bungee cords 220 connect to the cover 200. It is contemplated that the bungee cords 220 could be removably connected to the cover 200. It is contemplated that none, one or more than two bungee cords 220 could be used. It is also contemplated that the bungee cords 220 could be rigid straps. It is contemplated that instead of or in addition to the bungee cords 220, one or more straps could be used to secure the cover 200 at the rear 201 and/or on the sides of the cover 200. It is also contemplated that the rear 201 of the cover 200 could have an elastic contouring the rear of the seat 138 when the cover 200 covers the snowmobile 100. Other biasing means are contemplated.

Figure 5:
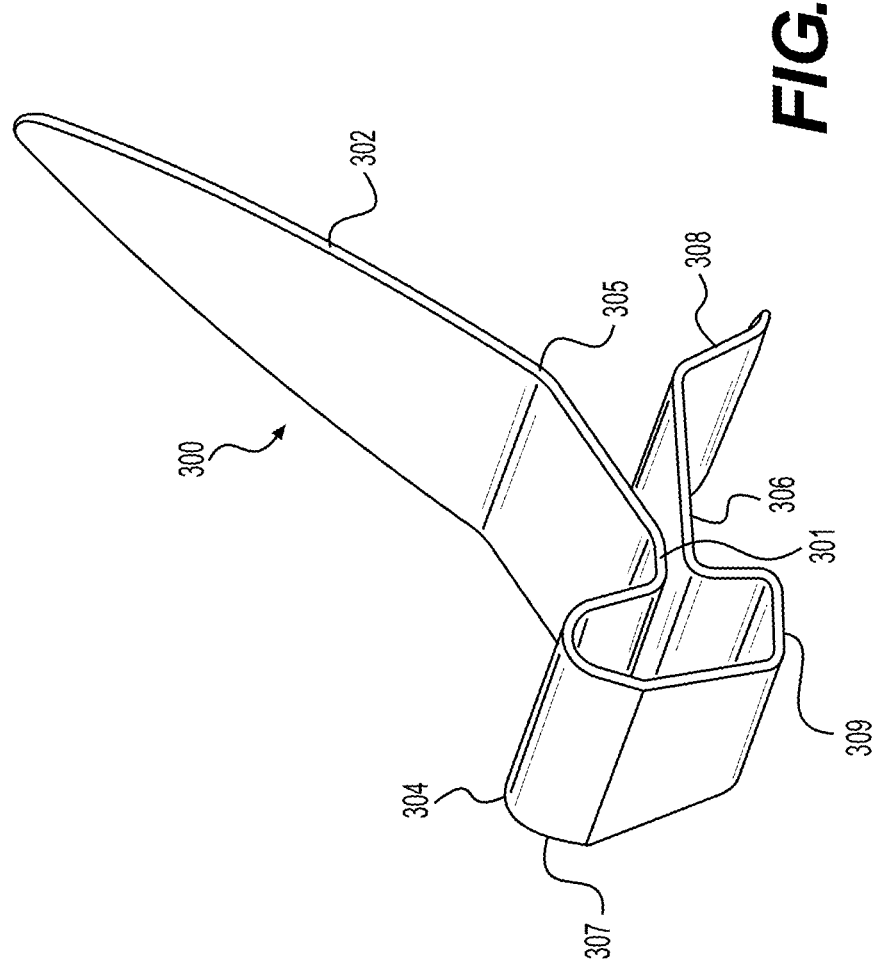
FIG. 5 is a perspective view of a first embodiment of a clip for the cover of FIG. 2.
Figure 6:
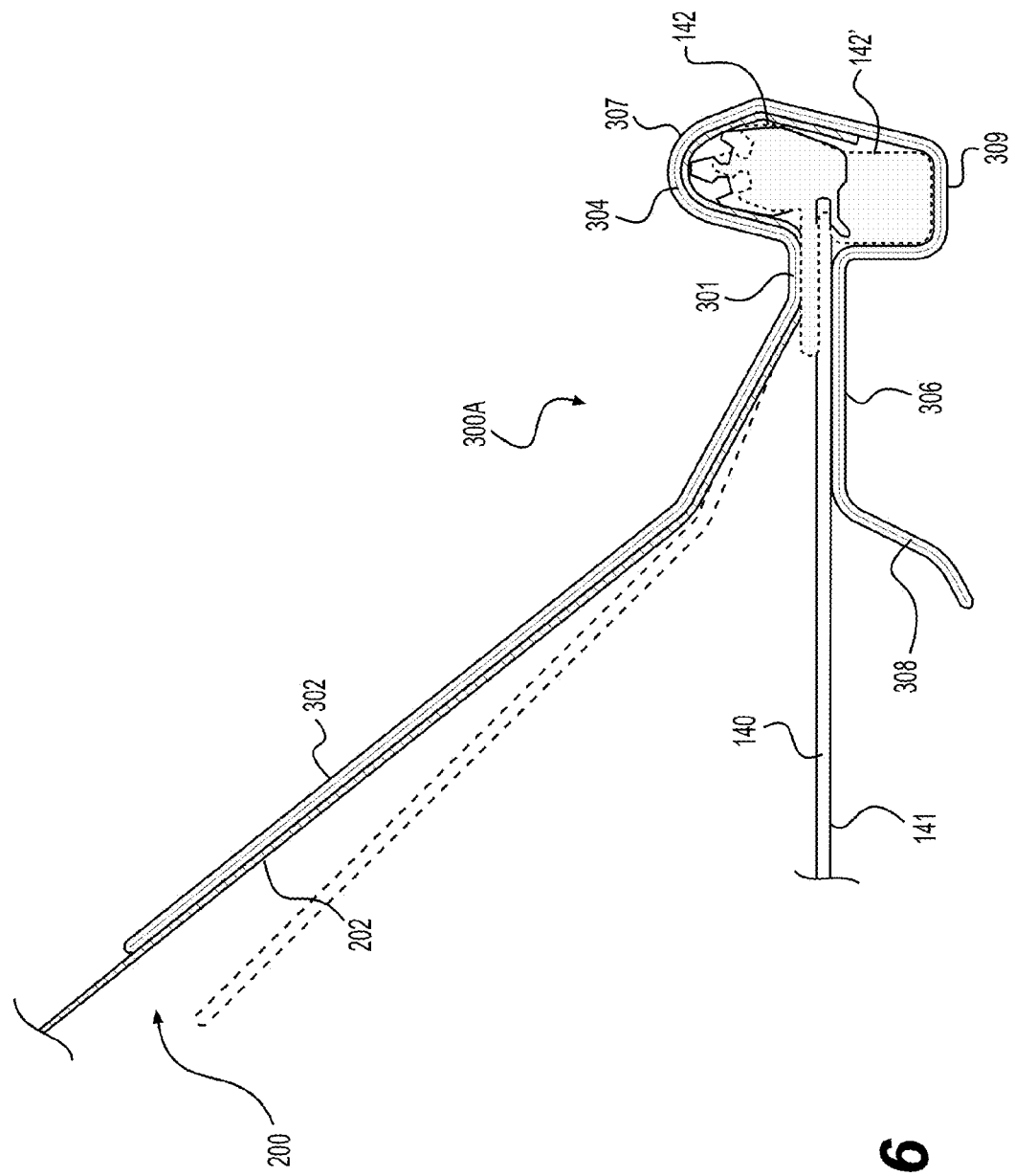
FIG. 6 is a cross-sectional view of the clip of FIG. 5, with a portion of the cover and a portion of a foot rest of the snowmobile, both of FIG. 2.

Referring now to FIGS. 5 and 6, a first embodiment of the clips 300 of the protective cover 200 will be described in greater detail. Since all the clips 300 (i.e. 300A to 300C) are identical, only one of the clips 300 will be described. It is contemplated that some or all the clips 300 could be different from each other.

The clip 300 is longer than it is wide. It is contemplated that the clip 300 could have a shape different from the one shown. The clip 300 has a plate-like portion 302, an attachment portion 304, a flat portion 306, and a handle portion 308.

The plate-like portion 302 is fixedly connected to the cover 200. As mentioned above, several ways to connect the clip 300 to the cover 200 are contemplated. It is also contemplated that only a portion of the plate-like portion 302 could be connected to the cover 200. It is also contemplated that the plate-like portion 302 could not be fixedly connected to the cover 200.

The plate-like portion 302 acts as a spring to bias the cover 200 toward a body of the snowmobile 100. An unbiased state of the plate-like portion 302 is shown in phantom in FIG. 6. When disposed around the snowmobile 100 with the clips 300 connected, the cover 200 applies a force on the plate-like portion 302 which tends to move the plate-like portion 302 away from the flat portion 306. By reaction, the plate-like portion 302 forces the cover 200 toward the body of the snowmobile 100. As a consequence, when the cover 200 is covering the snowmobile 100, the plate-like portion 302 applies a pressure to the cover 200 so as to remove slack in the cover 200. The result of pressure applied to the cover 200 by the plate-like portion 302 is best seen in FIG. 4, where a cross-section of the cover 200 and a cross-section of a prior art cover 200PA shown in dotted lines, both covering the snowmobile 100 are shown superimposed. The cover 200PA typically attaches to the snowmobile 100 via one of more straps (not shown) to be connected under or around the periphery of the tunnel 108. The cover 200PA does not have means that bias the cover 200PA toward the body of the snowmobile 100, as the cover 200 does. Because the cover 200 has the clips 300 having the plate-like portion 302 for biasing the cover 200 toward the body of the snowmobile 100, a space between the body of the snowmobile 100 and the cover 200 is reduced (as illustrated by space reduction 210) compared to the cover 200PA. As a consequence, the cover 200 snugs the snowmobile 100 tighter than the cover 200PA, and flapping (illustrated by arrows 211) of the cover 200 is reduced.

Returning to FIGS. 5 and 6, the plate-like portion 302 has a generally ogive shape, similar to a flat iron. It is contemplated that the plate-like portion 302 could have a different shape. It is also contemplated that the plate-like portion 302 could have one or more apertures. The plate-like portion 302 has a slight bend 305 located near a connection to the attachment portion 304. It is contemplated that the bend 305 could be omitted. It is also contemplated that the bend 305 could be a rounded corner, and that the plate-like portion 302 could have more than one bend 305.

The attachment portion 304 is connected to the plate-like portion 302 and selectively connects to the foot rests 140 for the side clips 300A, B and to the upper A-arms 117 of the front suspension assembly 118 for the front clips 300C. It is contemplated that the attachment portion 304 could be adapted to connect to parts of the snowmobile 100 other than the edge 142 and other than the left and right upper A-arms 117. The attachment portion 304 has a top portion 307 that has a generally rounded inverted U-shape, and a bottom portion 309 that has a generally squared U-shape. It is contemplated that the attachment portion 304 could have a different shape.

The top portion 307 of the attachment portion 304 is somewhat congruent with the edge 142 of the foot rests 140 (as best seen in FIG. 6), and with the upper A-arms 117 of the front suspension assembly 118 such that the side clips 300A, B connect with the foot rests 140, and the front clips 300C with the A-arms 117. It is contemplated that the front and sides clips 300A, B, C could be two different types of clips. For example, the front clips 300C could have the attachment portion 304 more closely congruent with the left and right upper A-arms 117, and that the side clips 300A, B have the attachment portion 304 more closely congruent with the edge 142 of the foot rests 140 instead of having an attachment portion 304 shaped to be suitable for connection to both the A-arms 117 and the edges 142. It is also contemplated that the top portion 307 of the attachment portion 304 could not be congruent with the edge 142 of the foot rests 140 and/or the upper A-arms 117, as long as there is a connection that is established between the attachment portion 304 and the edge 142 and/or the upper A-arms 117 for connecting the cover 200 to the snowmobile 100. Although the top portion 307 of the attachment portion 304 is shown contacting the edge 142, it is contemplated that a space could be formed between the top portion 307 and the edge 142. The top portion 307 of the attachment portion 304 is also connected to the cover 200. The top portion 307 can be connected to the cover 200 by sewing, gluing or other suitable means such as those described above. It is also contemplated that the top portion 307 could not be connected to the cover 200.

As shown in FIG. 6, the bottom portion 309 is not congruent nor does it connect with the edge 142 of the foot rests 140. The bottom portion 309 is also not congruent nor does it connect with the upper A-arms 117. The bottom portion 309 is however congruent with the edge 142' that has a shape different from the one of the edge 142. It is contemplated that when the foot rest 140 does not have a protruding edge 142, 142'. The attachment portion 304 could be adapted to connect with only the foot rest 140 and not with the edge 142.

The attachment portion 304 also has a flat portion 301 which abuts to an upper side of the edges 142 of the foot rest 140. The flat portion 301 creates a first pinch point (or contact surface) of the clip 300. It is contemplated that the flat portion 301 could be adapted to abut directly with an upper side of the foot rest 140. It is also contemplated that the flat portion 301 could be omitted.

The flat portion 306 is connected to the bottom portion 309 of the attachment portion 304. When the cover 200 covers the snowmobile 100, the flat portion 306 of the clips 300A abuts against a flat under surface 141 (shown in FIG. 6) of the foot rests 140. The flat portion 306 prevents the clip 300 from rotating due to the tension force within the cover 200 when the cover 200 is in place covering the snowmobile 100. The flat portion 306 creates a second pinch point (or contact surface) of the clip 300. It is contemplated that the flat portion 306 could not be flat. It is contemplated that the portion 306 could be curved or congruous to a bottom surface of a footrest or the part of the vehicle to which the clip 300 is to be connected.

Figure 7:
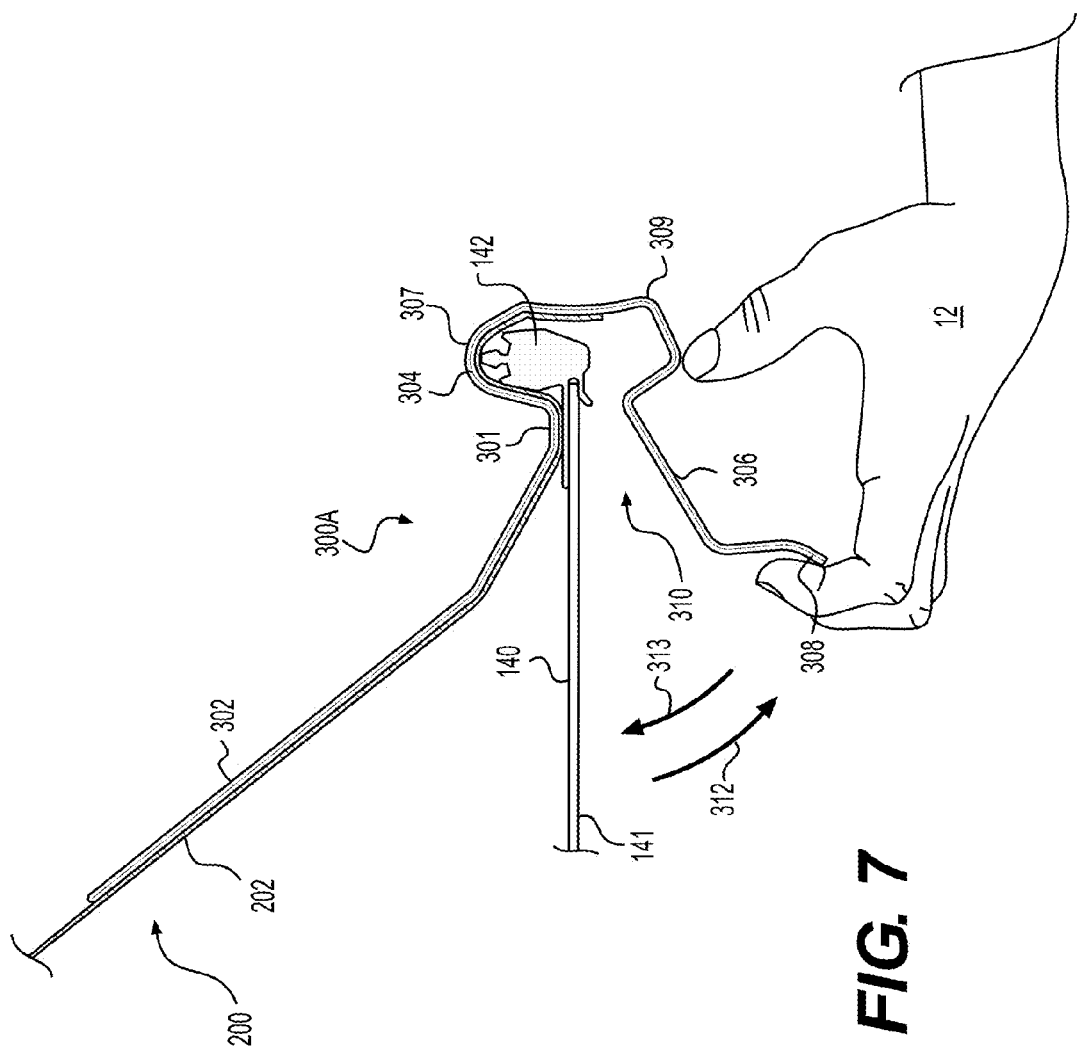
FIG. 7 is a cross-sectional view of the clip, cover and footrest of FIG. 6 with the clip being released from or connected to the foot rest.

The handle portion 308 is a tab connected to the flat portion 306 and is used for operating the clip 300. The handle portion 308 can be operated by a single hand 12 of the user 10 to disconnect the cover 200 from the foot rest 140, as shown in FIG. 7. It is contemplated the handle portion 308 could be operated by only a few fingers. It is contemplated that the user 10 could use both hands 12 to operate the clip 300. It is contemplated that the handle portion 308 could be shaped differently than shown in the Figures. For example, the handle portion 308 could have an aperture. It is also contemplated that the handle portion 308 could be omitted.

Turning now to FIG. 7, an operation of the clip 300 will now be described. To cover the snowmobile 100 with the cover 200, the user 10 first disposes the cover 200 over the snowmobile 100 and positions the side clips 300A,B near the foot rests 140 and the front clips 300C near the front suspension assemblies 118 at places where they will connect thereto. It is contemplated that if the clips 300 were removable from the cover 200 and were removed, the user 10 would also connect the clips 300 to the cover body 202 either prior to or after positioning the side clips 300A, B near the foot rests 140 and the front clips 300C near the upper A-arms 117 of the front suspension assemblies 118.

The user 10 then flexes one of the clips 300 using the handle portion 308 in order to create an opening 310 between the plate-like portion 302 and the flat portion 306 (illustrated by arrow 312). The user 10 positions the attachment portion 304 around the edge 142 of the foot rests 140 for the left and right side clips 300A,B and around the upper A-arm 117 of the front suspensions assemblies 118 for the front clips 300C. Once in position, the user 10 releases the handle portion 308 which moves toward the plate-like portion 302 in the direction illustrated by arrow 313. The attachment portion 304 snugs the edge 142 of the foot rests 140 for the left and right side clips 300A, B and around the upper A-arm 117 of the front suspensions assemblies 118 for the front clips 300C. The flat portion 306 abuts against the flat under surface 141 of the foot rests 140 in the case of the left and right side clips 300A, B. The user 10 repeats the operation for each clip 300. Once the cover 200 is secured to the snowmobile 100, the cover 200 has little slack due to the plate-like portions 302 of the side clips 300A, B, which are biased against the foot rests 140. Finally, the user 10 attaches the bungee cords 200.

To remove the cover 200 from the snowmobile 100, the user 10 removes the bungee cords 200, reaches for the handle portion 308 and flexes one of the clips 300 using the handle portion 308 in way to create the opening 310 between the plate-like portion 302 and the flat portion 306 (illustrated by arrow 312). The user 10 then disconnects the attachment portion 304 from around the edge 142 of the foot rests 140 for the side clips 300A, B and from around the upper A-arm 117 of the front suspensions assemblies 118 for the front clips 300C. The user 10 positions the clip 300 so as to pass the edge 142, or the upper A-arm 117 depending on the clip 300, through the opening 310. Once passed through, the user 10 releases the tension created between the plate-like portion 302 and the flat portion 306 by releasing the handle portion 308 (as illustrated by arrow 313). The clip 300 then recovers its unstressed shape. The user 10 repeats the operation for each clip 300. The cover 200 can be removed from the snowmobile 100. If the clips 300 were removable from the cover 200, the user 10 could leave the clips 300 or not onto the cover 200 after having removed the cover 200 from the snowmobile 100.

Figure 8:
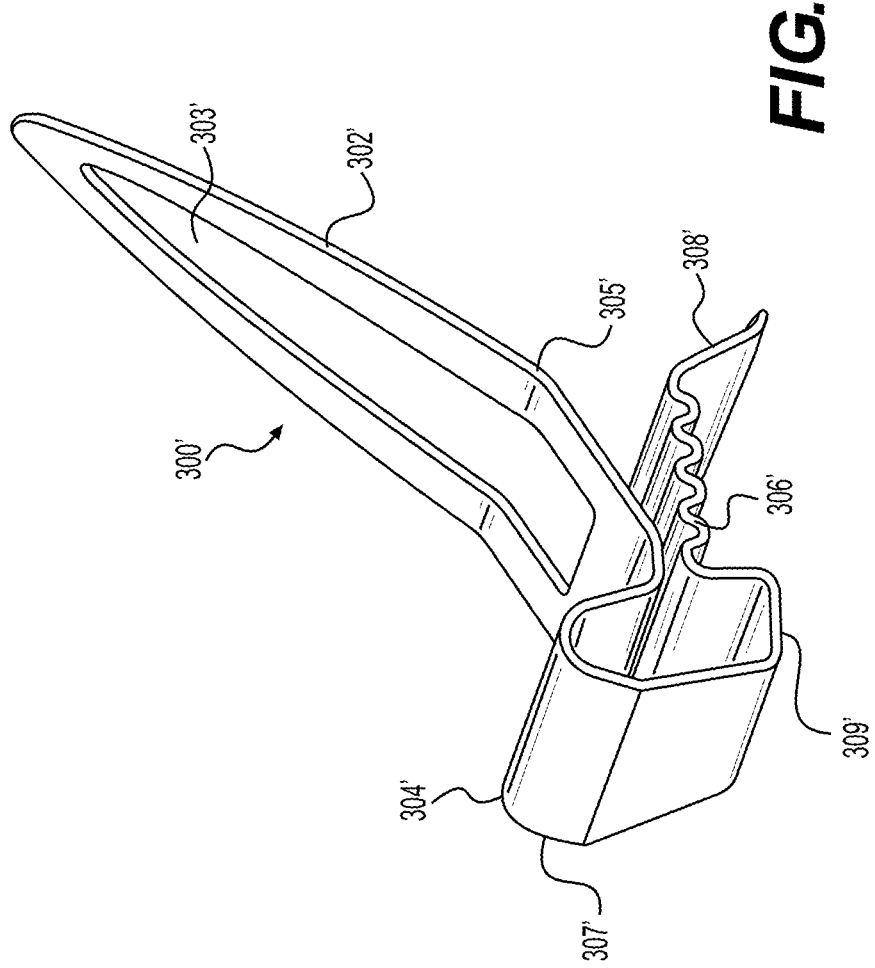
FIG. 8 is a perspective view of a second embodiment of a clip for the cover of FIG. 2.
Figure 9:
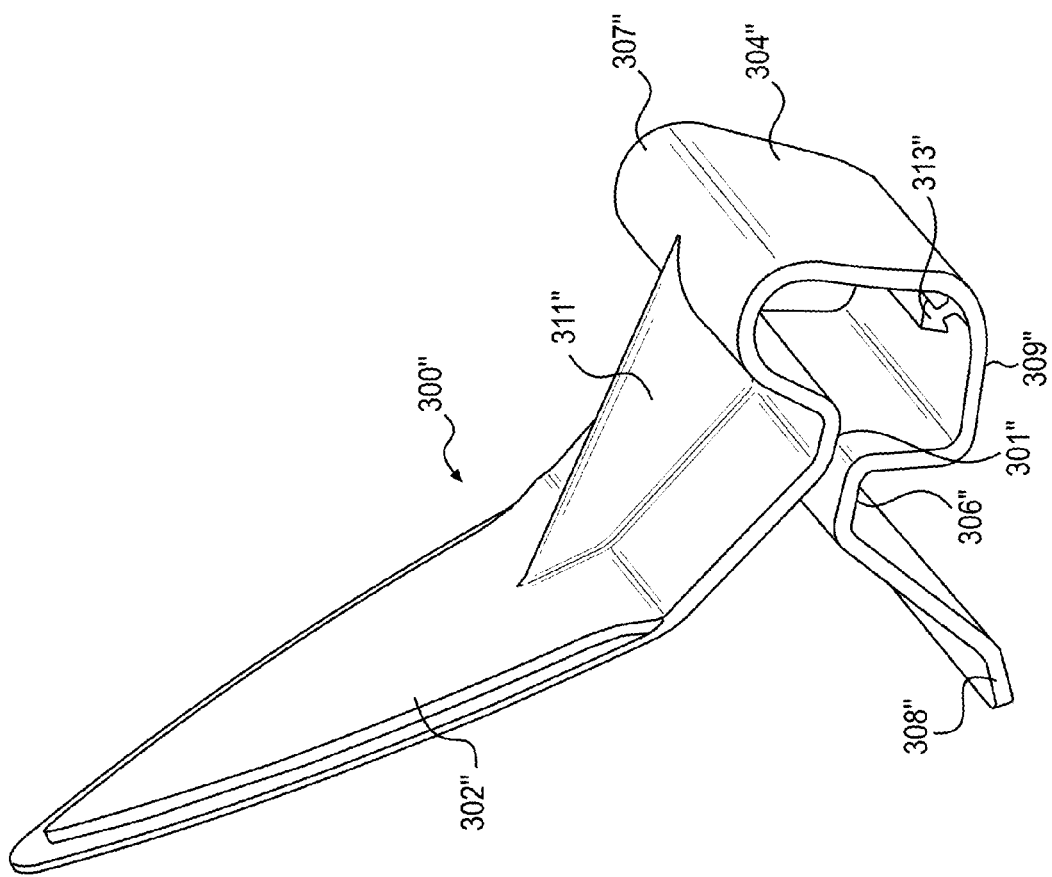
FIG. 9 is a perspective view of a third embodiment of a clip for the cover of FIG. 2.
Figure 10:
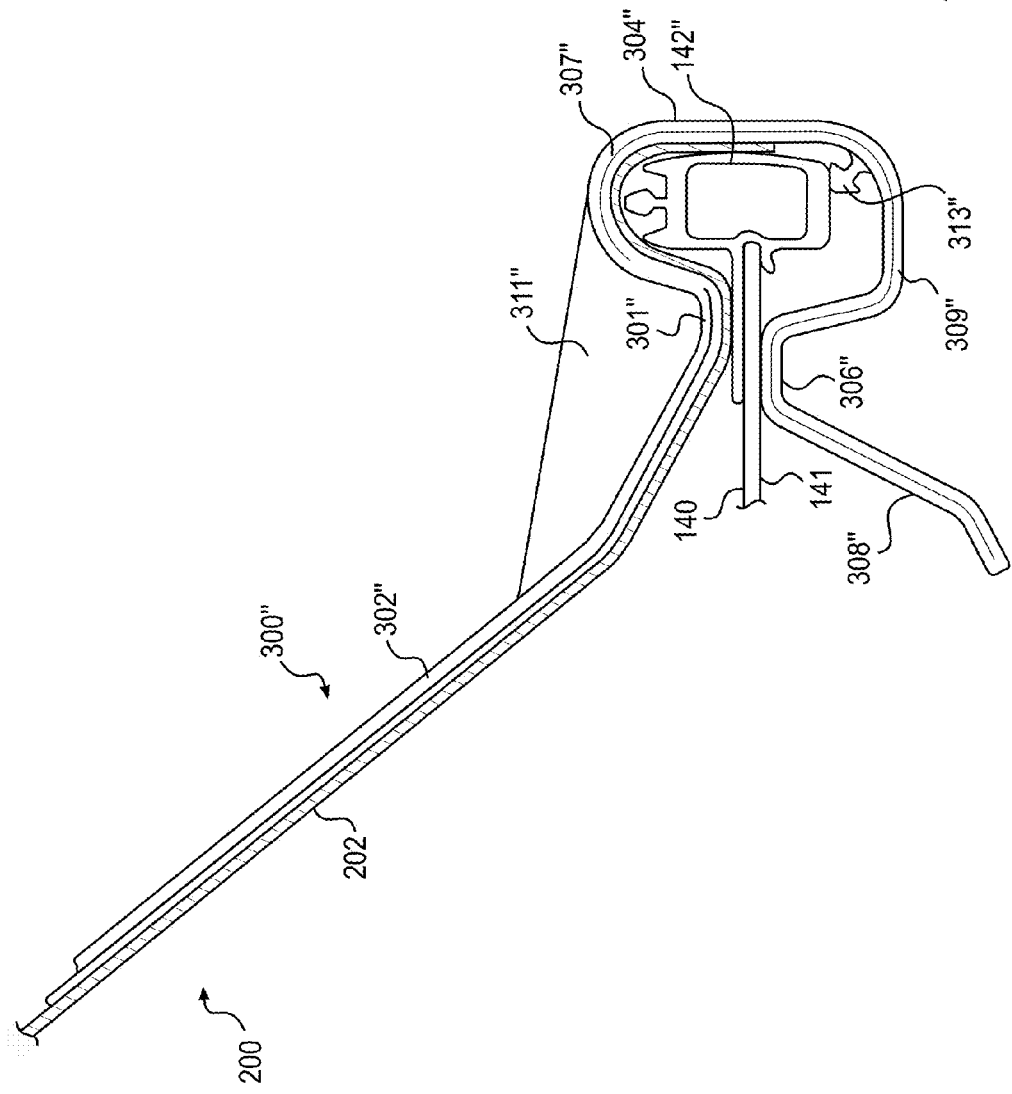
FIG. 10 is a cross-sectional view of the clip of FIG. 9, with a portion of the cover of FIG. 2 and a portion of a foot rest of the snowmobile of FIG. 1.

Referring to FIG. 8, a second embodiment of the clips 300' will be described. Elements common between the clips 300 and 300' will not be described in detail again.

The clip 300' has a plate-like portion 302', an attachment portion 304', a portion 306', and a handle portion 308'. The handle portion 308' is similar to the handle portion 308. The plate-like portion 302' is similar to the plate-like portion 302 except that it has an aperture 303'. The aperture 303' reduces a weight of the clip 300'. It is contemplated that the clip 300' could have no or more than one aperture 303'. Similarly to the clip 300, the clip 300' is bent at bend 305', and has a top portion 307' of the attachment portion 304' somewhat congruent with the edge 142 of the foot rests 140. It is contemplated that the top portion 307' of the attachment portion 304' could not be congruent with the edges 142 of the foot rests 140, as long as there is a connection that is established between the attachment portion 304 and the edge 142 for connecting the cover 200 to the snowmobile 100. A bottom portion 309' of the attachment portion 304' is not congruent nor does not connect with the edge 142 of the foot rests 140, but it is contemplated that the snowmobile 100 could have the edges 142 of the foot rests 140 more or less congruent with the bottom portion 309'. The portion 306' is similar to the flat portion 306 of the clip 300 except that it is rippled.

An operation of the clips 300' with the cover 200 is similar to the one described above with respect to the clips 300 and will therefore not be described herein again.

Turning now to FIGS. 9 to 12, a third embodiment of the clips 300" will be described. Elements common between the clips 300 and 300" will not be described in detail again.

The clip 300" has a plate-like portion 302", an attachment portion 304", a flat portion 306", and a handle portion 308". The plate-like portion 302", attachment portion 304", and handle portion 308" are similar to the ones of the clips 300. The flat portion 306" has a contact surface with the flat under surface 141 of the foot rests 140 that is smaller than the one of the flat portion 306. It is contemplated that the flat portion 306" could have a contact surface different than shown in the Figures. For example, the flat portion 306" could be similar to the portions 306 or 306'. It is also contemplated that the flat portion 306" could be omitted.

A reinforcement member 311" extends between the plate-like portion 302", top portion 307" of the attachment portion 304", and flat portion 301". The reinforcement member 311" increases a rigidity of an upper portion of the clip 300" (i.e. top portion 307", and flat portion 301") compared to a lower portion of the clip 300" (i.e. lower portion 309" and flat portion 306"). The reinforcement member 311" helps in part to reduce outward deflection of the cover 200 by increasing a rigidity of the upper portion of the clip 300". The cover 200 may deflect outward, for example, when wind is blowing between the snowmobile 100 and an inside of the cover 200. It is contemplated that the clips 300" could have no or more than one reinforcement member 311". It is also contemplated that the clips 300 and/or 300' could have the reinforcement member 311".

Figure 12:
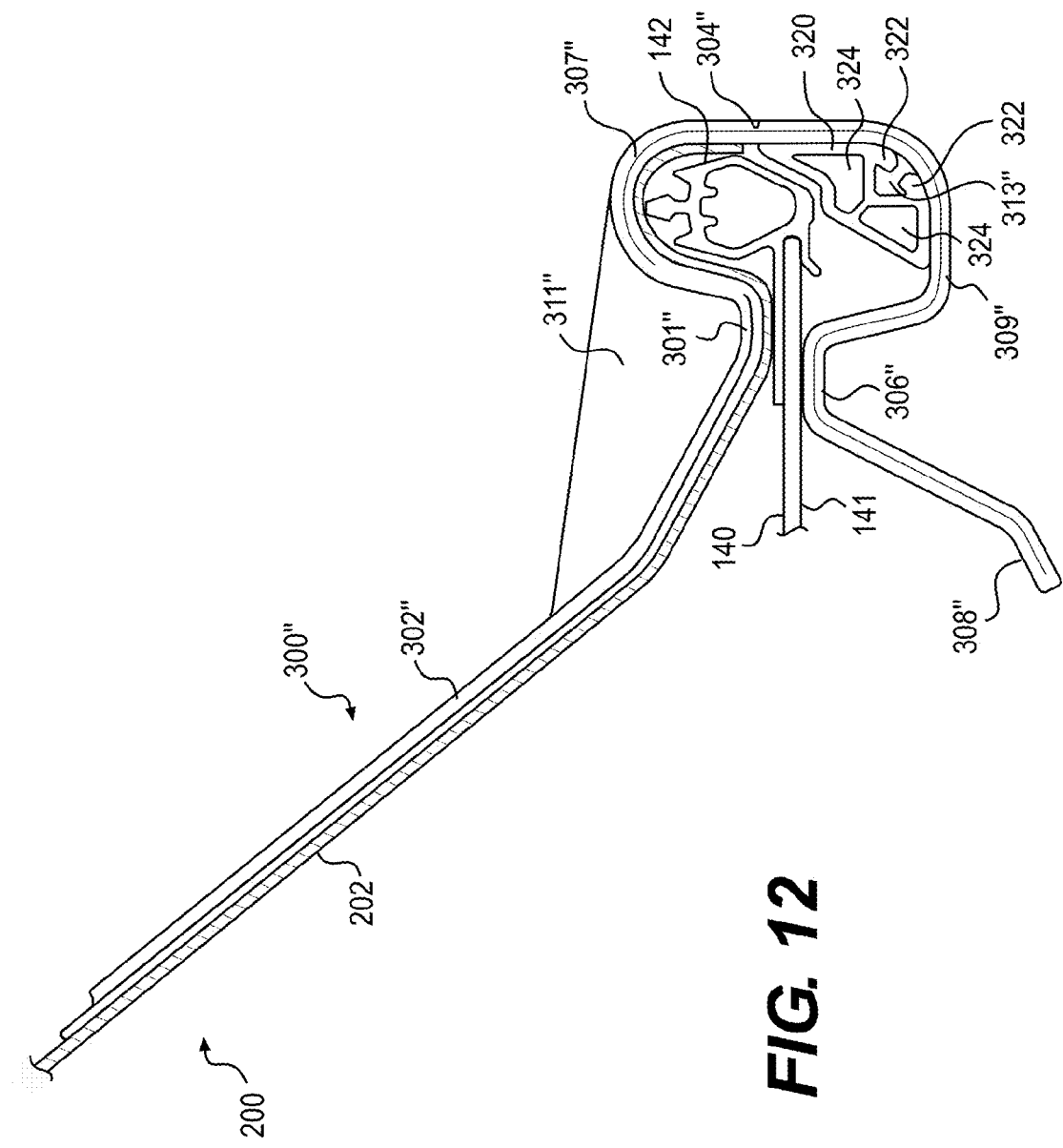
FIG. 12 is a cross-sectional view of the clip of FIG. 9 with the insert of FIG. 11, and a portion of the cover and a portion of a foot rest of the snowmobile, both of FIG. 2.

A bottom portion 309" of the attachment portion 304" has a protrusion 313" for abutting against an edge 142" (best shown in FIG. 10) of the foot rest 140. The protrusion 313" creates a pinch point (or contact surface) of the clip 300"

additional to the pinch points of the flat portion 301" and of the flat portion 306", which are similar to the ones described above for the clip 300. Because of this additional pinch point, closer to the top portion 307" than the pinch point of the flat portion 306", an amount by which the clip 300" would flex when under an outward constraint on the plate-like portion 302" is reduced. Thus the amount of outward constraint required to be applied to the flat portion 301" to open the clip sufficient enough so the that clip disengages from the edge 112 is increased, which decrease the probability that the cover will be inadvertently removed while towing a vehicle covered with the cover 200. As mentioned above, such outward constraint could be wind blowing between the snowmobile 100 and the inside of the cover 200. The protrusion 313" allows for reduced bending of portions of the clip 300" extending from the protrusion 313" to the flat portion 306" compared to bending of portions of the clip 300" extending from the protrusion 313" to the top portion 307". It is contemplated that were the reinforcement member 311" not present, the protrusion 313" would induce reduced bending of the portions of the clip 300" extending from the protrusion 313" to the flat portion 306" compared to bending of portions of the clip 300" extending from the protrusion 313" to the flat portion 301". Also, the protrusion 313" reduces a possibility for the flat portion 306" to act as a pivot point when the clip 300" is operated from the plate-like portion 302". A greater force is needed to disengage the clip 300" from the edge 142 when a force is being applied to the plate-like portion 302" compared to the clip 300 without protrusion 313", and in turn, the cover 200, may be harder to detach from the edge 142 when, for example, the wind is blowing under the cover 200. Further, the removal of the clip 300" by the user 10 when operated from a bottom of the clip 300" using the hand 12 is similar to if the protrusion 313" were not present because the protrusion 313" does not have a significant consequence on the rigidity of the portions of the clip 300" extending from the protrusion 313" to the handle portion 308" when pulling on the handle 308". As will be described below, the protrusion 313" is also shaped to receive an insert 320 for abutting against a different type of edge (for example the edge 142 as shown in FIG. 12). It is contemplated that the protrusion 313" could not be shaped to also receive the insert 320. It is also contemplated that the protrusion 313" could be disposed somewhere else in the attachment portion 304". The protrusion 313" spans almost an entire width of the clip 300". A portion of the handle 308" extends vertically below the protrusion 313" when the cover 200 covers the snowmobile 100. It is contemplated that the protrusion 313" could extend only along a portion of the width of the clip 300". It is also contemplated that the protrusion 313" could be made of multiple spaced apart segments. It is also contemplated that the entire handle 308" could be disposed vertically below the protrusion 313" when the cover 200 covers the snowmobile 100. The protrusion 313" and the reinforcement member 311" are integrally formed with the attachment portion 304" of the clip 300". It is contemplated that the protrusion 313" could not be integrally formed with the attachment portion 304" of the clip 300". It is contemplated that the protrusion 313" could have a shape different than the one shown in the Figures.

Figure 11:
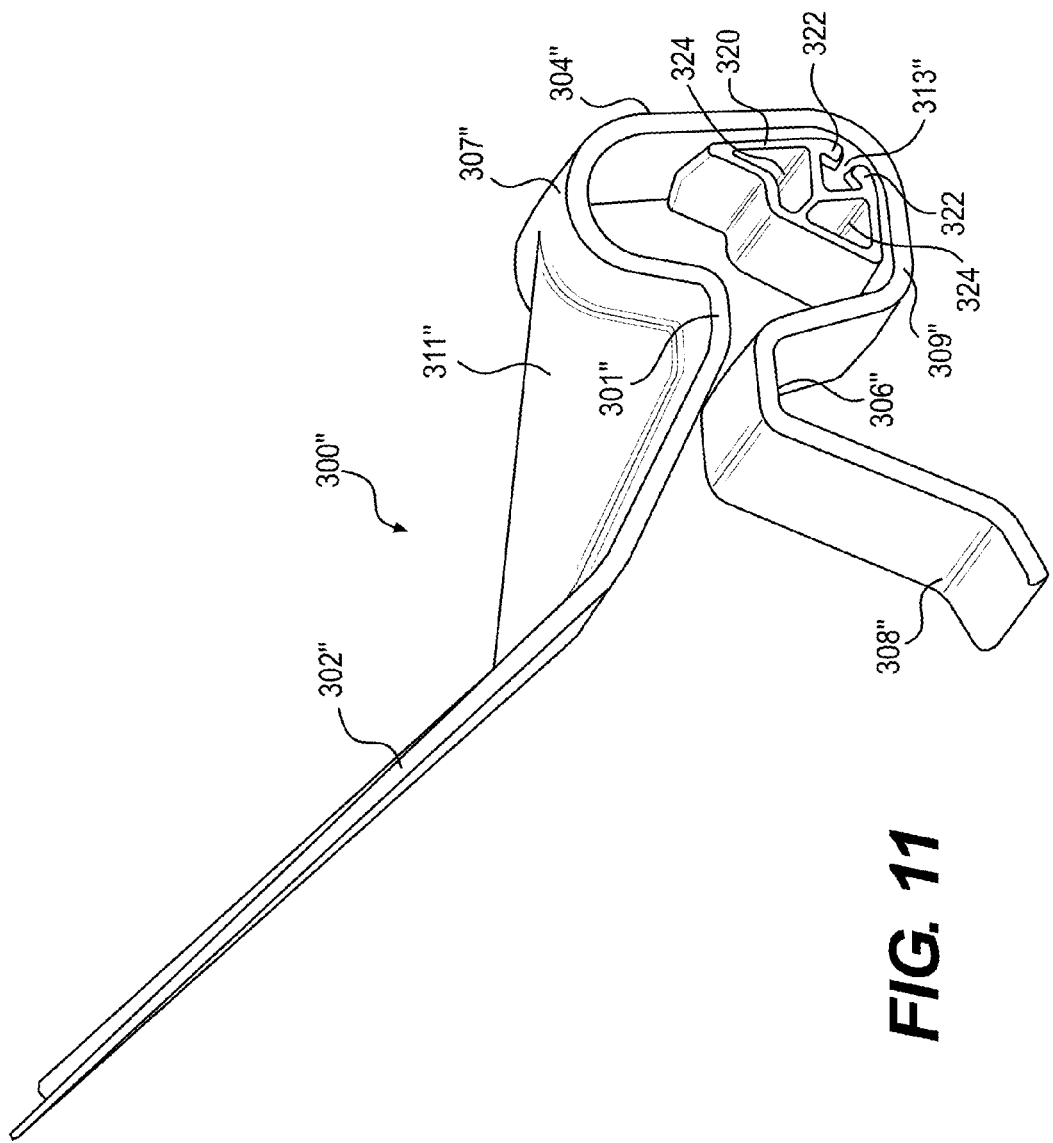
FIG. 11 is a perspective view of the clip of FIG. 9 shown with an insert.

Referring more specifically to FIGS. 11 and 12, a clip 300" is shown with the insert 320. As best seen in FIG. 12, the bottom portion 309" of the clip 300" is spaced from the edge 142 of the foot rests 140. The bottom portion 309" of the clip 300" is also not congruent with the edge 142 of the foot rests 140. To allow contact between the bottom portion 309" of the clip 300" and the foot rest 140, the insert 320 is connected to the clip 300" between the edge 142 and an inside of the attachment portion 304". As best shown in FIG. 12, the insert 320 is shaped to be generally congruent with a portion of a bottom surface of the edge 142. It is contemplated that the insert 320 could have a shape different than the one shown in the Figures. For example, the insert 320 could be shaped to be used on edges shaped differently from one another, so that the cover 200 is usable on different snowmobiles 100 without having to change the clips 300. It is also contemplated that there could be as many different inserts 320 as there are different edges 142. It is also contemplated that the inserts 320 could be provided in the clips 300" that are connectable to the A-arms 117. It is contemplated that the inserts connected to the A-arms 117 could be different from the inserts 320. It is contemplated that contact between the bottom portion 309" of the clip 300" and the edge 142" of foot rest 140 could be achieved by more than one insert disposed therebetween. It is also contemplated that the insert 320 could be omitted. It is also contemplated that the inserts 320 could be disposed between the attachment portion 304" and the edge 142" at a position on the attachment portion 304" other than the bottom portion 309".

As mentioned above, the insert 320 is connected to the protrusion 313". More specifically, the insert 320 is friction fitted onto the protrusion 313" so that it can easily be removed if the cover 200 is used with foot rest 140 edges different than the edges 142. A knob (not shown) on the protrusion 313" mates with a cavity (not shown) of the insert 320. It is contemplated that the knob and cavity could be omitted. It is also contemplated that the knob could be disposed on the insert 320 and the cavity on the protrusion 313". It is contemplated that the insert 320 could not be removable from the clip 300". The insert 320 has a pair of rails 322 so as to connect to the protrusion 313". It is contemplated that the insert 320 could be connected to the protrusion 313" by way other than the pair of rails 322. For example, the insert 320 could be clipped to the clip 300".

As best seen in FIG. 12, the inserts 320 are slightly smaller in width than the attachment portion 304". It is contemplated that the inserts 320 could extend from side to side of the attachment portion 304" or be smaller than shown in the Figures. The insert 320 is made of a same material as the clips 300". It is contemplated that the insert 320 could be made of a material different than the one of the clips 300". For example, the inserts 320 could be made of metal or of a compressible material so as to conform to a shape of the edge 142. The insert 320 has two apertures 324. The apertures 324 reduce a weight of the inserts 320 and thus of the cover 200. It is contemplated that the inserts 320 could have more or less than two apertures 324.

To use the clips 300" with the inserts 320, the user 10 slides the insert 320 into engagement with the protrusion 313" of the clip 300" until the knob mates the cavity. When the clips 300" are removable from the cover body 202, the user 10 can connect the inserts 320 with the clips 300" before connecting the clips 300" to the cover body 202. Once the clips 300" are connected to the inserts 320 and the cover body 202, the user 10 engages the clip 300" onto its corresponding foot rest 140 or A-arm 117, as described above.

An operation of the clips 300" with the cover 200 is similar to the one described above with respect to the clips 300 and will therefore not be described.

Figure 13:
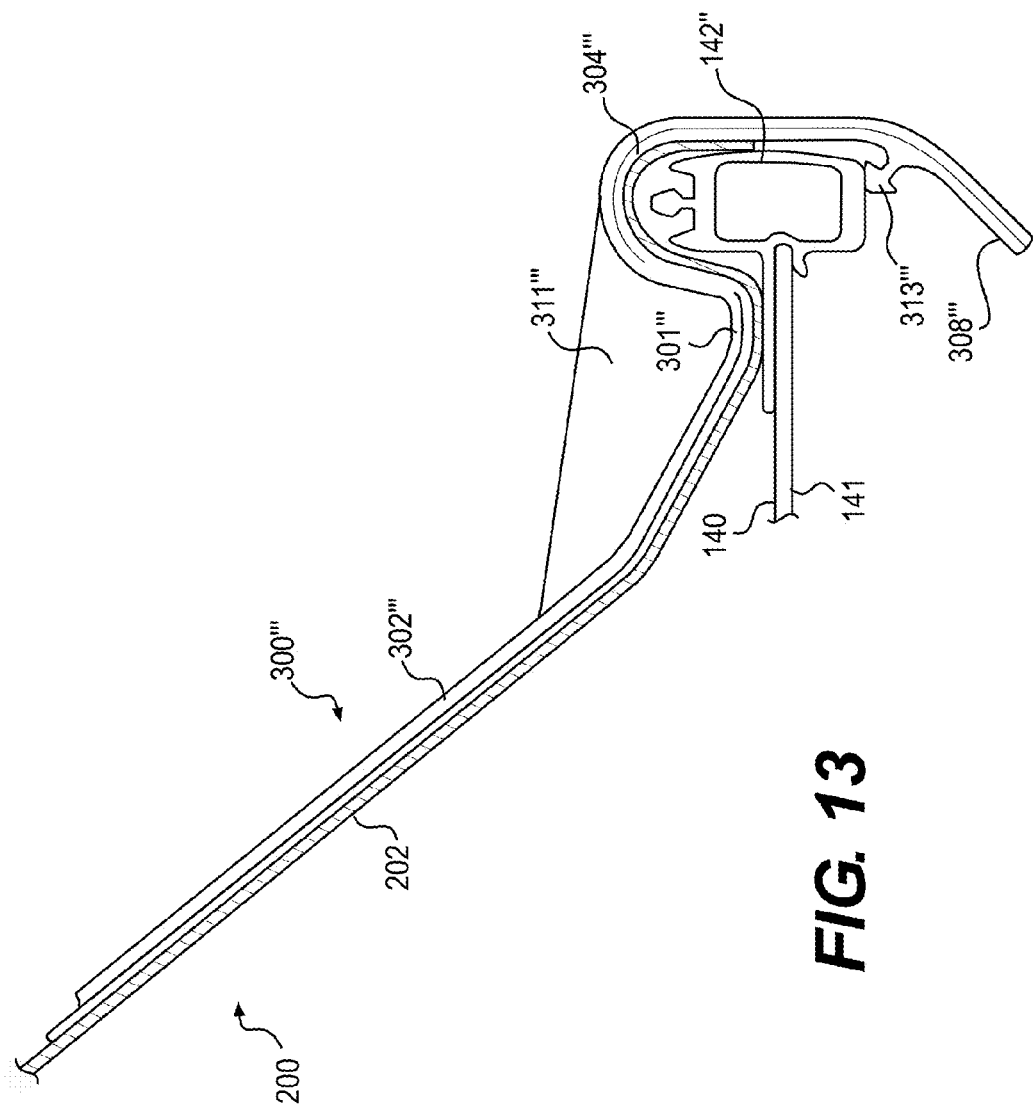
FIG. 13 is a cross-sectional view of a fourth embodiment of a clip for the cover of FIG. 2, with a portion of the cover of FIG. 2 and a portion of a foot rest of the snowmobile of FIG. 1.

Turning now to FIG. 13, a fourth embodiment of the clips 300''' will be described. Elements common between the clips 300 and 300''' will not be described again.

The clip 300''' has a plate-like portion 302''' and an attachment portion 304''' similar to the ones of the clips 300". The clip 300''' does not have the flat portion 306" that contacts the under surface 141 of the foot rest 140 and have a handle portion 308''' different from the handle portion 308. A reinforcement member 311''' similar to the reinforcement member 311'' extends between the plate-like portion 302''', portion 301''' and the attachment portion 304'''. A protrusion 313''' similar to the protrusion 313'' is designed to abut against the edge 142'' of the foot rest 140. The protrusion 313''' is a flange that can receive an insert similar to the insert 320 for abutting against a different type of edge of the foot rest 140 or of the A-arms 117. It is contemplated that the protrusion 313''' could not be shaped to also receive an insert.

The handle portion 308''' is directly connected to the attachment portion 304''' to connect and disconnect the clip 300''' from the snowmobile 100, similarly to the handle portion 308. The entire handle 308''' extends vertically below the protrusion 313''' when the cover 200 covers the snowmobile 100. It is also contemplated that only a portion of the handle 308''' could be disposed vertically below the protrusion 313''' when the cover 200 covers the snowmobile 100. An operation of the clips 300''' with the cover 200 is similar to the one described above with respect to the clips 300 and will not be described in detail herein again.

Modifications and improvements to the above-described embodiments of the present may become apparent to those skilled in the art. The foregoing description is intended to be exemplary rather than limiting. The scope of the present is therefore intended to be limited solely by the scope of the appended claims.

What is claimed is:

1. A cover for covering at least partially a vehicle, the cover comprising:
    a cover body having a peripheral edge and a longitudinal centerline; and
    at least two clips connected to the cover body on opposite sides of the longitudinal centerline, each of the at least two clips including:
        a first portion connected at least partially to a cover body portion of the cover body, the first portion being disposed over the cover body portion when the cover covers the vehicle, the first portion being resilient and adapted to bias the cover body toward the vehicle when the cover covers the vehicle; and
        a second portion connected to the first portion, the cover body portion being disposed between the second portion and the longitudinal centerline, the second portion being adapted to selectively connect to a vehicle portion of the vehicle.

2. The cover of claim 1, wherein the vehicle portion is a first vehicle portion;
    the cover further comprising:
        a third portion being adapted to selectively abut against a second vehicle portion of the vehicle, the third portion being connected to the second portion, the third portion being at an angle with respect to the first portion.

3. The cover of claim 2, wherein each of the at least two clips further includes a handle portion operatively connected to the third portion.

4. The cover of claim 1, wherein each of the at least two clips is at least partially resilient.

5. The cover of claim 2, wherein at least one of the first portion and the third portion of each of the at least two clips is substantially flat.

6. The cover of claim 1, wherein the first portion of each of the at least two clips has a bend.

7. The cover of claim 1, wherein at least a portion of the second portion of each of the at least two clips is connected to the cover body.

8. The cover of claim 2, wherein the second portion of each of the at least two clips includes a protrusion, and the protrusion is adapted to selectively abut a third vehicle portion of the vehicle.

9. The cover of claim 1, wherein the vehicle portion is a first vehicle portion; and
    wherein the second portion of each of the at least two clips includes a protrusion and the clip further comprises an insert, the insert is connected to the protrusion, the insert is adapted to selectively abut a second vehicle portion of the vehicle.

10. The cover of claim 9, wherein the insert of each of the at least two clips is removably connected to the protrusion.

11. The cover of claim 10, wherein the insert of each of the at least two clips is connected to the protrusion by friction fit.

12. The cover of claim 1, wherein the cover is adapted to cover at least partially a snowmobile.

13. A cover for covering at least partially a vehicle, the cover comprising:
    a cover body; and
    at least one clip connected to the cover body,
    the at least one clip being adapted to selectively connect the cover body to a vehicle portion of the vehicle,
    the at least one clip including a clip portion connected at least partially to a cover body portion of the cover body,
    the cover body portion being in contact with the clip portion and the vehicle portion when the at least one clip connects the cover body to the vehicle portion,
    the cover body portion that is in contact with the clip portion and the vehicle portion also being disposed between the clip portion and the vehicle portion when the at least one clip connects the cover body to the vehicle portion.

14. The cover of claim 13, wherein the clip portion of the at least one clip is resilient and adapted to bias the cover body toward the vehicle when the at least one clip connects the cover body to the vehicle portion.

15. The cover of claim 13, wherein:
    the vehicle portion is a first vehicle portion; and
    the at least one clip further includes an other clip portion adapted to selectively abut against a second vehicle portion of the vehicle, the other clip portion being connected to the clip portion, the other clip portion being at an angle with respect to the clip portion.

16. The cover of claim 15, wherein the at least one clip further includes a handle portion operatively connected to the other clip portion.

17. The cover of claim 15, wherein at least one of the clip portion and the other portion is substantially flat.

18. The cover of claim 13, wherein the at least one clip is at least partially resilient.

19. The cover of claim 13, wherein the cover is adapted to cover at least partially a snowmobile.

20. The cover of claim 13, wherein the at least one clip is at least two clips connected to the cover body on opposite sides of a longitudinal centerline of the cover body.

* * * * *